United States Patent

Holm et al.

[15] 3,649,963

[45] Mar. 14, 1972

[54] ERROR DETECTION ARRANGEMENT FOR REGISTER-TO-REGISTER DATA TRANSMISSION

[72] Inventors: Barry Douglas Holm, Naperville; Daniel John Senese, Lisle, both of Ill.

[73] Assignee: Bell Telephone Laboratories, Incorporated, Murray Hill, N.J.

[22] Filed: June 5, 1970

[21] Appl. No.: 43,803

[52] U.S. Cl. ....................340/146.1, 235/153

[51] Int. Cl. ....................G08c 25/00

[58] Field of Search ....................235/153; 340/146.1, 172.5

[56] References Cited

UNITED STATES PATENTS 3,234,518 2/1966 Rakoczi et al. ....................235/153 X 3,523,279 8/1970 Briley et al....................340/146.1

OTHER PUBLICATIONS

Seller, Hsiao, and Bearnson, Error Detecting Logic for Digital Computers, McGraw-Hill Co., 1968, pp. 89–91

*Primary Examiner*—Charles E. Atkinson
*Attorney*—R. J. Guenther and R. B. Ardis

[57] ABSTRACT

An arrangement for checking the contents of one register against the contents of another after a transfer of information therebetween. The contents of a source and a destination register are consecutively gated onto a linking bus which gating also controls inputs to a check register parallelly connected with the bus. After a completed sequence of gating operations, the contents of the check register should conform to normal initial states. Any differences from the initial states indicate that the contents of the destination and source registers differ as a result of a transmission error.

2 Claims, 4 Drawing Figures

INVENTORS B. D. HOLM
D. J. SENESE
BY William H. Kamstra
ATTORNEY

ERROR DETECTION ARRANGEMENT FOR REGISTER-TO-REGISTER DATA TRANSMISSION

BACKGROUND OF THE INVENTION

1. Field of the Invention

This invention relates to information processing systems and more particularly to arrangements for detecting errors during the transmission of data from one location to another in a data processor.

A data transmission error checking arrangement is described which can be employed advantageously to verify accurate transfer of all data from one register to another register within a data processing system, particularly, in data processing arrangements wherein transfer of data from one register to another register is a frequent occurrence in the course of executing data processing functions.

2. Description of the Prior Art

Transfer of data between registers is a common occurrence in many data processing applications. Where such a data transfer is not accurate, erroneous processing results will occur. Accordingly, most data processors employ some type of checking arrangement to assure the accurate transmission of data between a source and a destination. Recent advances in the state of the data processing art have greatly increased the reliability of data transmission and some data processing arrangements are capable of substantially error-free transmission. The inordinate expense of providing such facilities, however, limits their feasibility to only those applications where the highest reliability is required.

A less costly arrangement for checking the accuracy of date transmission employs the well-known parity checking function. This type of checking arrangement, however, does not ensure a coincidence between the contents of a data source and the contents of a data destination. Other highly refined error detection arrangements have also been developed. These systems generally involve encoding circuits for converting code "words," each having a fixed value of digits, into modified words having additional digits. The redundancy of information within the word allows the decoder to detect transmission errors. These arrangements, while quite effective, are also frequently so expensive as to be impractical in most applications.

The problem to which this invention is directed is the implementation of a complete checking operation between the contents of a data source and that of a data destination between which data is transmitted by means of simpler, relatively inexpensive circuitry.

It is an object of this invention to compare the contents of a destination register with the contents of a source register after a transfer of information between the registers has been performed over a data bus.

It is a further object of this invention to accomplish the aforenoted data comparison with a minimum of circuitry.

It is a further object of the present invention to accomplish error detection without altering the form of the message data to be transmitted.

A still further object of this invention is the incorporation of the aforenoted data comparison operation during a functional check upon the bus system interconnecting the source register and the destination register.

SUMMARY OF THE INVENTION

In accordance with one specific illustrative embodiment of the invention, data, represented by binary electrical signals, is transferred between a source register and a destination register over a bus system of a data processor. Subsequent to the transfer of the data between the registers, the contents of a check register, which is connected to the bus system, are inspected for a deviation from a predetermined pattern as an indication of either the improper transmission of data between the source and destination registers or the malfunctioning of the destination register.

The operation of the error detecting arrangement depends both upon the complementary characteristics of Reset Set Toggle (RST) type flip-flops comprising the check register and the sequential gating of the signal contents of the source and destination registers onto the bus system. The check register is initially in a reset state in which all flip-flops are in the binary "0" state. The contents of the source register, when transferred to the destination register via the bus system, also actuate the respective flip-flops of the check register. The contents of the destination register are subsequently gated onto the bus system and again actuate the check register flip-flops. If these contents are identical with the contents of the source register, the respective flip-flops will be cleared and the check register returned to the reset state. The contents of the check register are then inspected for a nonconformity, i.e., in one specific illustrative embodiment the presence in any one or more of the check register flip-flops in the set or binary "1" state, as an indication that the contents of the source and destination registers are not identical.

BRIEF DESCRIPTION OF THE DRAWING

The above and other objects and features of the invention will be more apparent when the following description is read with reference to the accompanying drawing in which.

DETAILED DESCRIPTION

Figure 1:
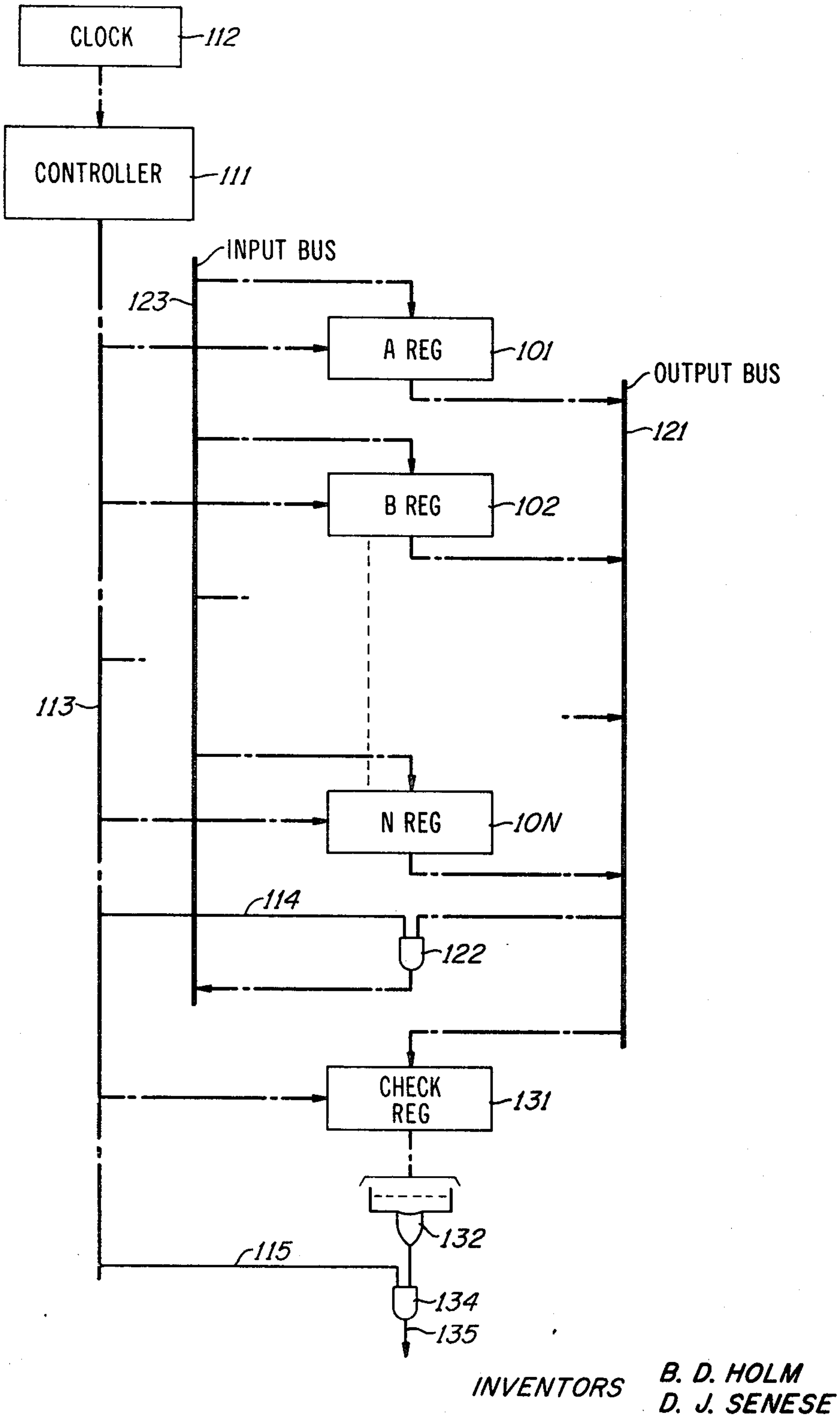
FIG. 1 illustrates a typical bus and gating system for transmitting data between selected registers and a transmission error checking arrangement associated with the bus.

A data transfer arrangement according to this invention is illustrated in FIG. 1 and may comprise a portion of a data processor in which information transfer is required between selected registers during particular data processing operations. Other circuits and associated equipment of such a data processor which constitute the context of the depicted circuit are not shown as unnecessary for a complete understanding of this invention. For example, equipment for gating data into the circuit shown in FIG. 1 from other system sources and for transferring that data elsewhere are omitted.

The data transfer arrangement of this invention comprises a plurality of registers 101 through 10N interconnected by an Output Bus 121 and an Input bus 123 under the control of command signals generated by a Controller 111. Each of the registers comprises an N stage array of reset-set (RS) type of flip-flops for the storage of data. The input and output leads of the N stages of the registers are connected by gating arrangements to corresponding conductors of the Input Bus 123 and Output Bus 121, respectively. The buses are linked via a Bus Gate 122 which is also under the control of command signals generated by Controller 111 transmitted over Cable 113 and Lead 114.

Controller 111 comprises part of the data processor with which this error detection arrangement is advantageously adapted for use and may be assumed to include an instruction decoder and a source of command signals. Address and instruction signals are assumed to be applied to Controller 111 from a central control of the processor system. The instruction decoder, in response to central control signals, defines a source register and a destination register, within the plurality of registers 101–10N, between which data is to be transmitted. The source of command signals of Controller 111 is a sequence circuit having the capability of advancing from an inactive initial state through several active states and returning to the inactive initial state; in one specific embodiment, five active states are assumed. The command signals generated by the sequencer circuit are controlled by a Clock Source 112 of the data processor system. Further details of Controller 111 and details of Clock Source 112 are omitted as unnecessary for a complete understanding of this invention.

In accordance with the invention, a Check Register 131 monitors, again actuated by command signals from Controller 111, output signals from registers 101–10N which are impressed upon Output Bus 121. Check Register 131 comprises an N stage array of RST type of flip-flops wherein the respective toggle terminals of the array are connected by a gating arrangement to corresponding conductors of Output Bus 121 while all of the reset terminals of the array are connected to Controller 111 via Cable 113.

The conformity of the output signals of Check Register 131 is tested by a circuit arrangement comprising OR gate 132, Inspect Gate 134, and Control Lead 115. Single rail logic output leads of Check Register 131 are connected to the input terminals of an OR gate 132. The output of OR gate 132 is applied to one of two input terminals of Inspect Gate 134; the other input terminal of Gate 134 is extended via Lead 115 to Controller 111. As a result, signals impressed upon Lead 115 enable Gate 134 to interrogate the output state of OR gate 132.

The final output signals of the illustrative circuit arrangement of FIG. 1 appear on the Output Lead 135 of Inspect Gate 134 and may be used to control error correction or warning circuits, for example. The latter circuits do not constitute essential parts of this invention and would in any event be envisioned by one skilled in the art.

Figure 2:
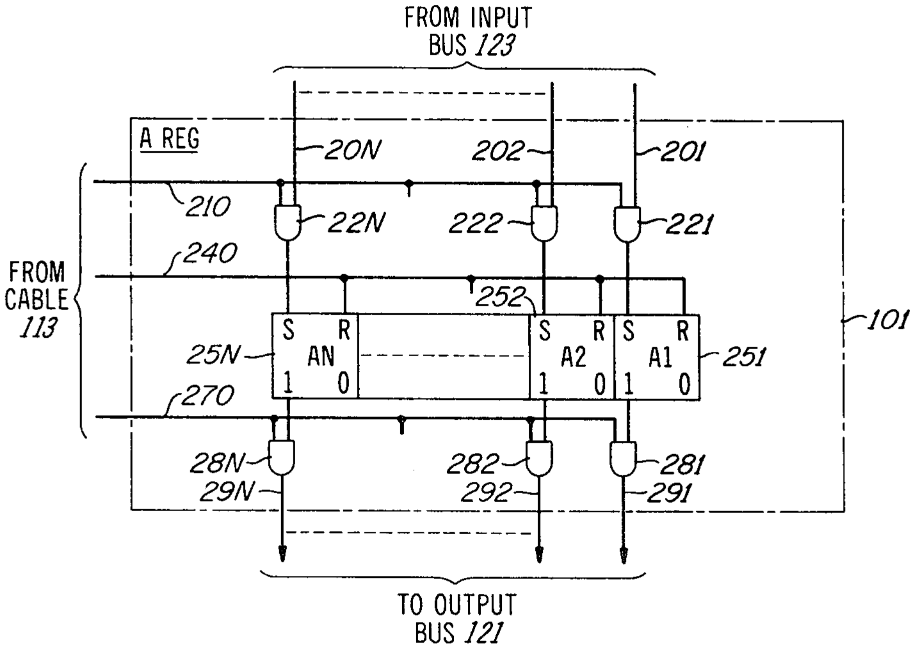
FIG. 2 illustrates an exemplary data register and input and output gating control arrangements which can be used to implement and control the transmission of data between selected registers over the bus arrangement of FIG. 1.

Before proceeding to a detailed consideration of the operation of this invention, details of the elements of a typical register 101–10N and Check Register 131 are noted. The registers 101–10N each comprise a plurality of stages 251–25N as shown in FIG. 2 for the Register 101. These stages may comprise flip-flops, well known in the art, having set and reset states. Inputs to the set terminals of the stages 251–25N are received from corresponding outputs of a plurality of AND gates 221–22N. The reset terminals receive inputs from Controller 111 extended via Cable 113 and Lead 240. Information inputs applied to leads 201–20N from Input Bus 123 control the setting of the stages in conjunction with command signals transmitted on Lead 210 from Controller 111 via Cable 113. Information outputs of stages 251–25N are each impressed upon one of the inputs of each of corresponding output AND gates 281–28N. The latter are enabled by command signals transmitted on Lead 270 from Controller 111 via Cable 113. Information outputs of gates 281–28N are applied via corresponding conductors 291–29N to Output Bus 121.

Figure 3:
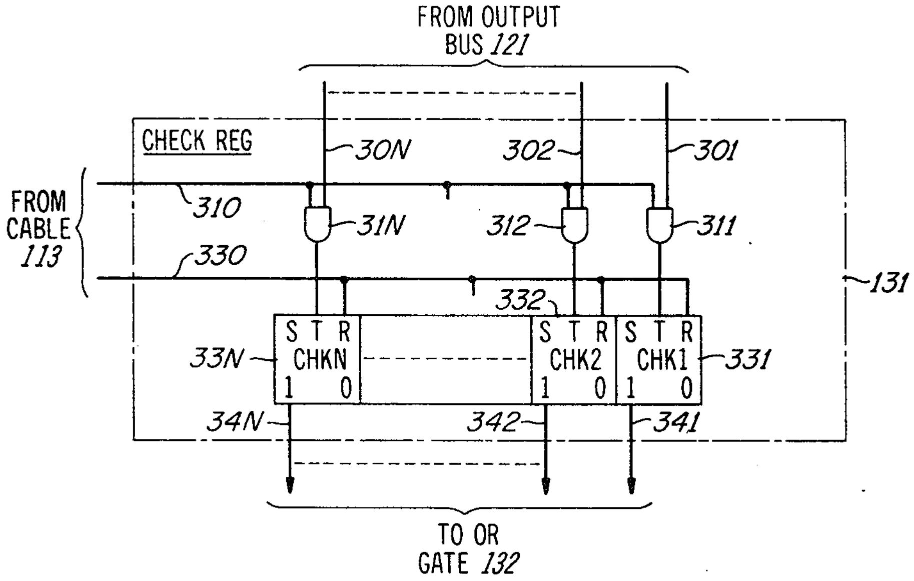
FIG. 3 depicts an illustrative check register and gating arrangement which can be used in verifying that the contents of the source and destination registers are identical.

Details of an exemplary Check Register 131 are shown in FIG. 3. The latter comprises a plurality of stages 331–33N which correspond in number to the stages of a data register of the array 101–10N. These stages may comprise flip-flops which have three input terminals, and are well known in the art. The set and reset input terminals of stages 331–33N have signals applied to them that perform the same function as the corresponding signals applied to the terminals of stages 251–25N of the data register array. A triggering signal applied to the toggle input terminal causes the stage to change its binary state regardless of the existing state of the flip-flop. Thus, each successive excitation applied to the toggle terminal causes a shift in the binary state of the stage.

Signals applied to input AND gates 311–31N from corresponding leads 301–30N of Output Bus 121 control the toggling of the corresponding stages 331–33N in conjunction with command signals transmitted from Controller 111 via Cable 113 and Lead 310. Information outputs of stages 331–33N are each impressed upon output leads 341–34N which are connected to corresponding input terminals of OR gate 132.

Other arrangements for data registers 101–10N and Check Register 131 are manifestly also applicable. The details which have been provided are for the purpose of description only.

The following description of a typical inaccurate data transfer operation will serve to illustrate the principles of the invention as implemented by the specific illustrative embodiment shown in FIGS. 1, 2, and 3. For this purpose, it will be assumed that the transfer is between Source Register 101 and Destination Register 10N and that included in the information stored in the former is a binary 1 contained in its Stage 251. It is further assumed that Input Gate 221 of register 10N is defective due to some malfunction such as, typically, its output lead being shorted to ground thereby preventing Stage 251 of register 10N from being subsequently switched from its normal binary 0 state.

Figure 4:
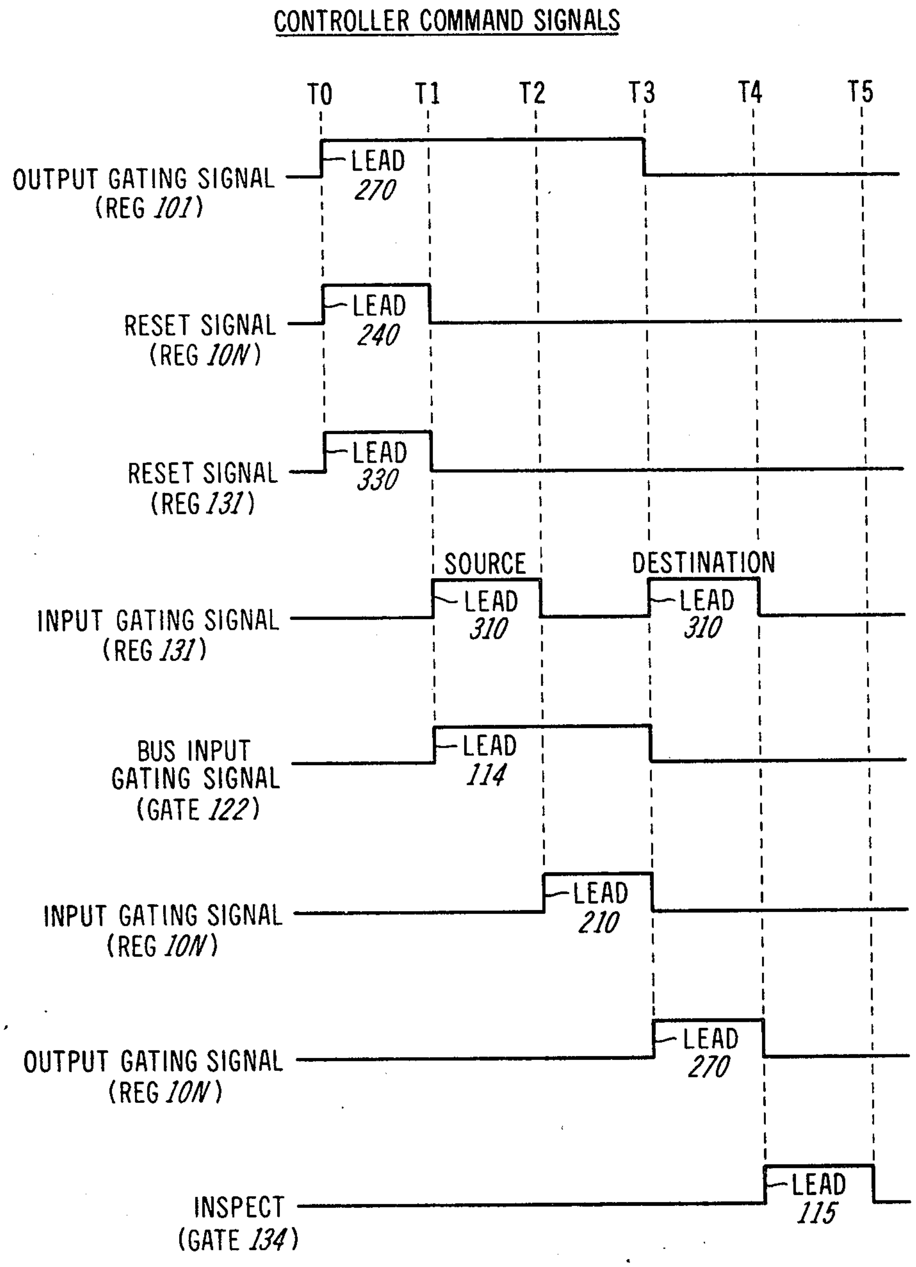
FIG. 4 illustrates the waveforms and timing relationships of command signals that control the operation of the registers and gating circuitry of FIGS. 1, 2, and 3.

As shown in FIG. 4, the following nomenclature will be used in describing the timing of the transmission error checking arrangement. The controller cycle in this embodiment is assumed to be divided into five equal intervals, the beginning of each interval being denoted as T0, T1, T2, T3, and T4; T5 denoting the termination of the controller cycle. Each controller pulse begins or ends at one of the times T0, T1, T2, T3, T4, T5 and is conveniently designated ATB where A is the number corresponding to the time of the leading edge of the pulse and B corresponds to the time of the trailing edge.

At time T0, command signals, which are represented in FIG. 4, are transmitted from Controller 111 via Cable 113 to control the selection of Register 101 as the source register and register 10N as the destination register, and cause Check Register 131 to be reset as a precondition to testing the validity of the transfer of data between registers 101 and 10N.

A command signal and Lead 270 of Register 101 depicted in FIG. 2 of duration 0T3 enables output gates 281–28N thereby transferring the contents of stages 251–25N onto the Output Bus 121. In the illustrative case being considered, the coincidence of binary 1 signals applied to the input terminals of AND gate 281 from the output terminal of Stage 251 and the command signal from Controller 111 applied on Lead 270 actuates Gate 281 and impresses a binary 1 signal upon Lead 291. This signal is applied to the corresponding conductor of Output Bus 121 during the interval 0T3.

The command signals transmitted from Controller 111 to both Destination Register 10N and Check Register 131 are of duration 0T1. The reset signal impressed upon Lead 240 of Destination Register 10N causes its stages 251–25N to be shifted to the binary 0 state, thereby clearing the register for the subsequent storage of the signals transmitted from Source Register 101. More specifically, the command reset signal impressed upon the reset terminal of Stage 251 of Destination Register 10N from Controller 111 via Cable 113 and Lead 240 shifts the stage to the binary 0 state during the interval 0T1.

The command reset signal impressed on Lead 330 of Check Register 131, depicted in FIG. 3, shifts stages 331–33N to the binary 0 state during the interval 0T1 thereby clearing the Check Register 131 for the subsequent storage of the signals impressed upon the Output Bus 121. More specifically, the command signal impressed on the reset terminals of Stage 331 from Controller 111 via Cable 113 and Lead 330 shifts the signal impressed on Output Lead 341 to the binary 0 state during the interval 0T1.

Controller 111 transmits command signals, which are represented in FIG. 4 at time T1 as an input gating signal, on Cable 113 to Check Register 131 and Lead 114 which is connected to Bus Gate 122. The command signal applied to Lead 310 of Check Register 131 is of duration 1T2 while the signal impressed upon Lead 114 is of duration 1T3.

The command input gating signal applied to Lead 310 enables input gates 311–31N which permit the transfer of the signals impressed upon Output Bus 121 to the toggle terminals of stages 331–33N. In the illustrative case, the coincidence of two binary 1 signals applied to the input terminals of AND gate 311, actuates the gate and impresses a binary 1 signal upon the input toggle terminal of Stage 331. The first input signal to Gate 311 is the command input gating signal from Controller 111 via Cable 113 and Lead 310, of duration 1T2. The second input signal is received from Lead 301 of Output Bus 121 and Output Gate 281 of Register 101 and is of the same duration of the output gating signal, namely, 0T3. The toggling signal switches Stage 331 from its initial binary 0 state to the binary 1 state during the interval 1T2.

Gate 122 is a representative one of a plurality of gates that correspond to the number of stages in Register 101. The command signal applied to Bus Gate 122 from Controller 111 via Cable 113 and Lead 114 provides an enabling pulse which establishes a transmission path between Output Bus 121 and Input Bus 123 during the interval 1T3. More specifically, the coincidence of binary 1 signals applied to the input terminals of Gate 122 from the Output Bus 121, such as the signals applied during the interval 0T3 from Gate 281 of Register 101 and the command signal applied during the interval 1T3, actuates Gate 122 and impresses a binary 1 signal upon the corresponding conductor of Input Bus 123 for the interval 1T3.

A command input gating signal, which is represented in FIG. 4 at time T2, is transmitted from Controller 111 on Cable 113 and Lead 210 to the input gates of Destination Register 10N. This signal enables input AND gates 221–22N and transfers the contents of the signals impressed upon Input Bus 123 to the set terminals of stages 251–25N during the interval 2T3.

The malfunction assumed to demonstrate the operation of this invention, that is, the shorted output lead of Gate 221, inhibits the normal operation of Stage 251. As a result, the coincidence of the signals applied to the input terminals of AND gate 221 from Controller 111 via Cable 113 and Lead 210 of duration 2T3 and the signal from Gate 281 of Register 101 via Gate 122 and output and input buses 121 and 123, respectively, of duration 1T3, fails to shift the output signal of Gate 221 from the preexisting binary 0 state to the expected binary 1 state during the coincident interval of 2T3. The binary 0 signal is applied to the set terminal of Stage 251 which leaves the stage in the binary 0 state.

Command signals, which are represented in FIG. 4 at time T3, are transmitted from Controller 111, on Cable 113 to the input gates of Check Register 131 and the output gates of Destination Register 10N. These signals, having a duration of 3T4, are impressed upon Lead 310 of Check Register 131 and Lead 270 of Destination Register 10N.

The command input gating signal applied to Lead 310 enables input gates 311–31N and transfers the contents of the signals impressed upon Output Bus 121 to the corresponding toggle terminals of stages 331–33N. In the illustrative case, the present state of Stage 331 at time T3 is binary 1 due to the storage of the signal impressed upon the toggle terminal from Gate 281 of Register 101 via Output Bus 121 and Gate 311 during the interval 1T2. The binary 0 signal applied to an input terminal of Gate 311 from Gate 281 of Register 10N via Output Bus 121 during the interval 3T4 leaves Gate 311 in the nonoperative state when the binary 1 signal from Controller 111 via Cable 113 and Lead 310 is concurrently applied to the other input terminal of Gate 311. The binary 0 signal extended from Gate 311 to the toggle terminal of Stage 331 prevents the stage from being switched from its binary 1 state. As a result, during the interval 3T4 the signal impressed upon Lead 341 remains in the binary 1 state while it is assumed that the actuated stages of the array 332–33N have made a transition from the binary 1 state to the binary 0 state due to the successive complementing of the stages by the signals applied to the respective toggle terminals.

A command signal, which is represented in FIG. 4 at time T4, is transmitted from Controller 111 via Cable 113 and Lead 115 to Inspect Gate 134 which provides a strobing pulse for interrogating the contents of OR gate 132 at the end of the data transfer operations. As previously mentioned, it is assumed that Stage 331 of Check Register 131 is in the binary 1 state, while stages 332–33N are in the binary 0 state at the end of the data transfer operations. As a result, at time T4, Lead 341 is in the binary 1 state while leads 342–34N are in the binary 0 state. OR gate 112 is actuated by the binary 1 signal applied to Lead 341. The binary 1 signal impressed upon the output lead of OR gate 132 in coincidence with the binary 1 signal from Controller 111 during the interval 4T5 actuates Inspect Gate 134. As a result, during the interval 4T5 Inspect Gate 134 impresses a binary 1 signal on Output Lead 135 which actuates the utilization circuit, thereby providing an indication that an inaccurate transfer of data has occurred between Source Register 101 and Destination Register 10N.

It is to be understood that clearing the malfunction, i.e., removing the short on the output lead of Gate 221 of Destination Register 10N, permits the subsequent correct storage of the binary 1 signal in Stage 251 of Register 10N during the interval 2T3. The binary 1 signal stored in Stage 251 is impressed upon the Output Bus 121, during the interval 3T4, thereby resetting Stage 331 of Check Register 131. As a result of the complementing of the signals within Check Register 131 all the output leads 341–34N are in a binary 0 state at time T4. Thus, in response to the binary 0 signals impressed on the output leads of Check Register 131, OR gate 132, and Inspect Gate 134 remain in a nonoperative state. As a result, no signal is transmitted on Lead 135 during the interval 4T5, thereby indicating an accurate transfer of data between the Source Register 101 and the Destination Register 10N.

A complementary circuit arrangement for detecting inaccurate data transmissions could also be implemented by initially setting all check register stages 331–33N in a binary 1 state and subsequently detecting, after the data transfer operations, the presence of one or more binary 0 output signals as an indication of a mistransfer. The complementary circuit arrangement entails no changes in the array of storage registers 101–10N or Controller 111 and only two changes in the circuitry of Check Register 131. The first change is a shifting of the leads attached to Command Signal Lead 330 from the reset terminal to the set terminal of the respective stages 331–33N. The command signal impressed on the set terminals of stages 331–33N from Controller 111 via Cable 113 and Lead 330 shifts the state of the stages to the binary 1 state during the interval 0T1. The second change entails the shifting of output leads 341–34N from the 1 output terminal to the 0 output terminal of stages 331–33N. Thus, during the interval 4T5, the conformity detector will inspect the output leads of the Check Register 131 for binary 0 signals. As a result, the output indication at Lead 135 for a mistransfer of data will be the same for either circuit arrangement.

It may be noted that the illustrative malfunction could have occurred in any one or more other of the stages of the destination register or its associated conductor paths in the bussing system. In that event, a single error indication would be provided to the utilization circuit in a manner identical to that described in the foregoing in connection with a mistransfer to a single stage. The verification of the transfer of data between registers 101 and 10N by the Check Register 131 and its associated circuitry is merely illustrative of an application of the principles of the invention and is equally valid between any pair of registers within the array 101–10N.

It is to be understood that the above-described arrangements are merely illustrative of the application of the principles of the invention; numerous other arrangements may be devised by those skilled in the art without departing from the spirit and scope of the invention as defined by the accompanying claims.

What is claimed is:

1. A data transmission system having a plurality of data registers, said system comprising a common input transmission bus and a common output transmission bus associated with said plurality of data registers, and individual dedicated input path from said common input transmission bus for each of said data registers, an individual dedicated output path to said common output transmission bus for each of said data registers, transfer means for transferring particular binary information bits stored in a selected first register of said plurality of data registers to a selected second register of said plurality of data registers via a respective dedicated output path, common output transmission bus, common input transmission bus, and dedicated input path; and means for simultaneously checking the accuracy of said transfer of said information bits to said second register and the integrity of said common output transmission bus and of said dedicated output path of said second register preparatory to a subsequent transfer of said information bits received by said second data register to another register of said plurality of data registers comprising a check register having a predetermined initial pattern of binary information bits stored therein, an individual complementing input path from said common output transmission bus for said check register, said transfer means transferring said particular binary information bits also to said check register via said common output transmission bus and said complementing input path simultaneously with said transfer to said second data register to selectively logically complement said initial pattern of information bits stored in said check register, means for subsequently transferring the binary information bits received by said second data register to said check register via a respective dedicated output path of said second register, said common output transmission bus, and said complementing input path to selectively logically recomplement the complemented information bits present in said check register, and means for subsequently detecting in said check register information bits different from the information bits in said initial pattern of information bits.

2. A data transmission system according to claim 1 in which said initial pattern of binary information bits stored in said check register comprises a pattern of like binary bits.

* * * * *